(12) United States Patent
Jereb et al.

(10) Patent No.: US 11,188,060 B2
(45) Date of Patent: Nov. 30, 2021

(54) LIFECYCLE DATA FILES FOR INDUSTRIAL AUTOMATION PROJECT OPTIMIZATION

(71) Applicant: Rockwell Automation Technologies, Inc., Mayfield Heights, OH (US)

(72) Inventors: Barry M. Jereb, Chagrin Falls, OH (US); Peter Baron, Strongsville, OH (US); Brian Dipert, North Olmsted, OH (US); Jessica M. Truong, Eagle, WI (US); Jessica L. Korpela, Milwaukee, WI (US); Amit R. Sathe, Twinsburg, OH (US); Eric Rehl, Oak Creek, WI (US); Tracy L. Swartzendruber, Hudson, OH (US); Kyle K. Reissner, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 43 days.

(21) Appl. No.: 16/145,415

(22) Filed: Sep. 28, 2018

(65) Prior Publication Data
US 2020/0103874 A1  Apr. 2, 2020

(51) Int. Cl.
*G05B 19/41* (2006.01)
*G05B 19/418* (2006.01)
(Continued)

(52) U.S. Cl.
CPC ... *G05B 19/41845* (2013.01); *G05B 19/4188* (2013.01); *G05B 19/41815* (2013.01); *G06F 3/0482* (2013.01); *G06F 9/54* (2013.01)

(58) Field of Classification Search
USPC .......................................................... 705/7
See application file for complete search history.

(56) References Cited

U.S. PATENT DOCUMENTS 7,305,392 B1    12/2007  Abrams et al.
10,417,613 B1 *  9/2019  Brisebois ........... G06Q 10/1095
(Continued)

OTHER PUBLICATIONS

"Non-Final Office Action", U.S. Appl. No. 16/145,811, dated May 5, 2020, pp. 1-48, United States Patent and Trademark Office, Alexandria, Virginia.
(Continued)

*Primary Examiner* — Arif Ullah

(57) ABSTRACT

Various embodiments of the present technology provide an integrated platform that provides optimization tools that can be used across multiple lifecycle phases of an industrial automation system. In accordance with various embodiments, the integrated platform can take specified designs in a presale phase and easily open up that information in a corresponding tool to address needs in the post-sale phase to allow for all device commissioning, programming, and configuration without any importing, exporting, or recreation of presale files. Various embodiments use a common, cross-platform data file that links activity within each lifecycle phase. As such, any layouts or designs can be easily opened up within the platform by users with differing roles. Moreover, if in the post-sale phase, a control engineer decides that a specific aspect of control system was left out, the control engineer can summon the capability of the presale phase to expand the system.

18 Claims, 8 Drawing Sheets

(51) Int. Cl.
*G06F 9/54* (2006.01)
*G06F 3/0482* (2013.01)

(56) References Cited

U.S. PATENT DOCUMENTS

| | | | |
|---|---|---|---|
| 2005/0004825 A1* | 1/2005 | Ehrler | G06Q 10/10 705/7.17 |
| 2005/0114829 A1 | 5/2005 | Robin et al. | |
| 2005/0234763 A1 | 10/2005 | Pinto et al. | |
| 2006/0224254 A1 | 10/2006 | Rumi et al. | |
| 2007/0078658 A1 | 4/2007 | Virjil et al. | |
| 2008/0222065 A1 | 9/2008 | Kedrowski et al. | |
| 2009/0063309 A1* | 3/2009 | Stephens | G06Q 30/0283 705/29 |
| 2011/0126111 A1* | 5/2011 | Gill | G06F 21/577 715/736 |
| 2014/0058801 A1 | 2/2014 | Deodhar et al. | |
| 2014/0337429 A1 | 11/2014 | Asenjo et al. | |
| 2016/0282859 A1 | 9/2016 | Wilber et al. | |
| 2016/0292769 A1 | 10/2016 | Colson et al. | |
| 2017/0116552 A1 | 4/2017 | Deodhar et al. | |
| 2017/0330195 A1* | 11/2017 | Lange | G06F 3/0486 |
| 2018/0095938 A1* | 4/2018 | Monte | G06F 3/0488 |
| 2018/0114177 A1 | 4/2018 | Somech et al. | |
| 2019/0026634 A1 | 1/2019 | Homeyer et al. | |

OTHER PUBLICATIONS

"Non-Final Office Action", U.S. Appl. No. 16/145,619, dated Jun. 12, 2020, pp. 1-47, United States Patent and Trademark Office, Alexandria, Virginia.

United States Patent and Trademark Office, Final Office Action for U.S. Appl. No. 16/145,619, dated Mar. 9, 2021.

United States Patent and Trademark Office, Final Office Action for U.S. Appl. No. 16/145,510, dated Jun. 14, 2021.

United States Patent and Trademark Office, Non-Final Office Action for U.S. Appl. No. 16/145,811, dated Jun. 25, 2021.

United States Patent and Trademark Office, Notice of Allowance and Fee(s) Due for U.S. Appl. No. 16/145,619, filed Oct. 1, 2021, 62 pages.

* cited by examiner

LIFECYCLE DATA FILES FOR INDUSTRIAL AUTOMATION PROJECT OPTIMIZATION

TECHNICAL FIELD

Various embodiments of the present technology generally relate to industrial automation system design. More specifically, some embodiments of the present technology relate to platforms and tools for project optimization using lifecycle data files.

BACKGROUND

The rapid evolution in industrial automation systems has led to many factory environments that are partially or completely automated. Such automated systems allow for improved output with minimal input from humans. For example, automated manufacturing processes are common in automotive industry, chemical industry, food and beverage industry, mining and metal industries, and others. The industrial automation systems are often custom solutions designed to solve unique needs within each industry and for each company. Moreover, these industrial automation systems are more complex than ever and require tighter integration between other devices or systems on the plant floor and the rest of the enterprise. This integration requires a secure network infrastructure, smart devices for efficient data collection, and the ability to turn data into actionable information.

The expanding availability of options for motors, motor controllers, sensors, switches, relays, interface options, and various other components make designing, building, and maintaining these industrial automation systems more difficult than even. New parts are constantly being introduced, while some old parts are redesigned and replaced with improved versions or phase out of production. Moreover, some parts are compatible while other parts are not. As such, developing initial cost estimates, defining project scope, budget, total cost of ownership, implementation timelines, and risk assessments can all be challenging. Moreover, ensuring compliance with various safety and governmental standards that can vary across industries is another challenge in designing complex industrial automation solutions.

SUMMARY

Various embodiments of the present technology generally relate to industrial automation system design. More specifically, some embodiments of the present technology relate to platforms and tools for project optimization. Some embodiments provide for a method for operating an integrated platform. A selection of an application (e.g., studio suite, a bill of material builder, a repair manager, etc.) hosted by the integrated platform can be received. The application can be associated with a lifecycle phase (e.g., presale lifecycle phase and a post-sale lifecycle phase) of an industrial automation project. A cross-platform file can be accessed to retrieve data regarding the industrial automation project. The application can then be populated based on data from the cross-platform file in compliance with requirements of the application. In some embodiments, a role of the user can be identified. The role associated with the user has restrictions on data access within the cross-platform file.

In some embodiments, activity and selection within the application can be monitored by the integrated platform and one or more enhanced user experiences (e.g., recommendations, alternative selections, initial designs, etc.) can be generated. For example, in some embodiments, the user can select a bill of material builder to create an initial design and quote. The integrated platform can then analyze, using a machine learning engine, multiple cross-platform files to generate an initial design of at least a portion of the industrial automation project. As another example, when the lifecycle phase of the industrial automation project is within a post-sale phase, then any changes to the design of the industrial automation project automatically update the bill of materials within the cross-platform file.

Embodiments of the present invention also include computer-readable storage media containing sets of instructions to cause one or more processors to perform the methods, variations of the methods, and other operations described herein.

Some embodiments provide for a platform comprising a processor, one or more applications, a database, and a compute engine. The one or more applications (e.g., studio suite, a bill of materials builder, a repair manager, etc.) can be configured to service activities common during a lifecycle phase of an industrial automation project. The database can have stored thereon a cross-platform file associated with the industrial automation project that can be used by the one or more applications in any lifecycle phase. The compute engine can be configured to monitor the activity within the one or more applications and generate a customized enhanced user experience within the one or more applications. In some embodiments, the compute engine further comprises a recommendation engine to generate an alternative selection within the one or more applications based on a machine learning review of the cross-platform file. The compute engine can also be configured to analyze multiple cross-platform files to generate an initial design or alternative design of the industrial automation project. In some embodiments, the compute engine can be configured to analyze component lifecycle durability based on repair records within multiple cross-platform files.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
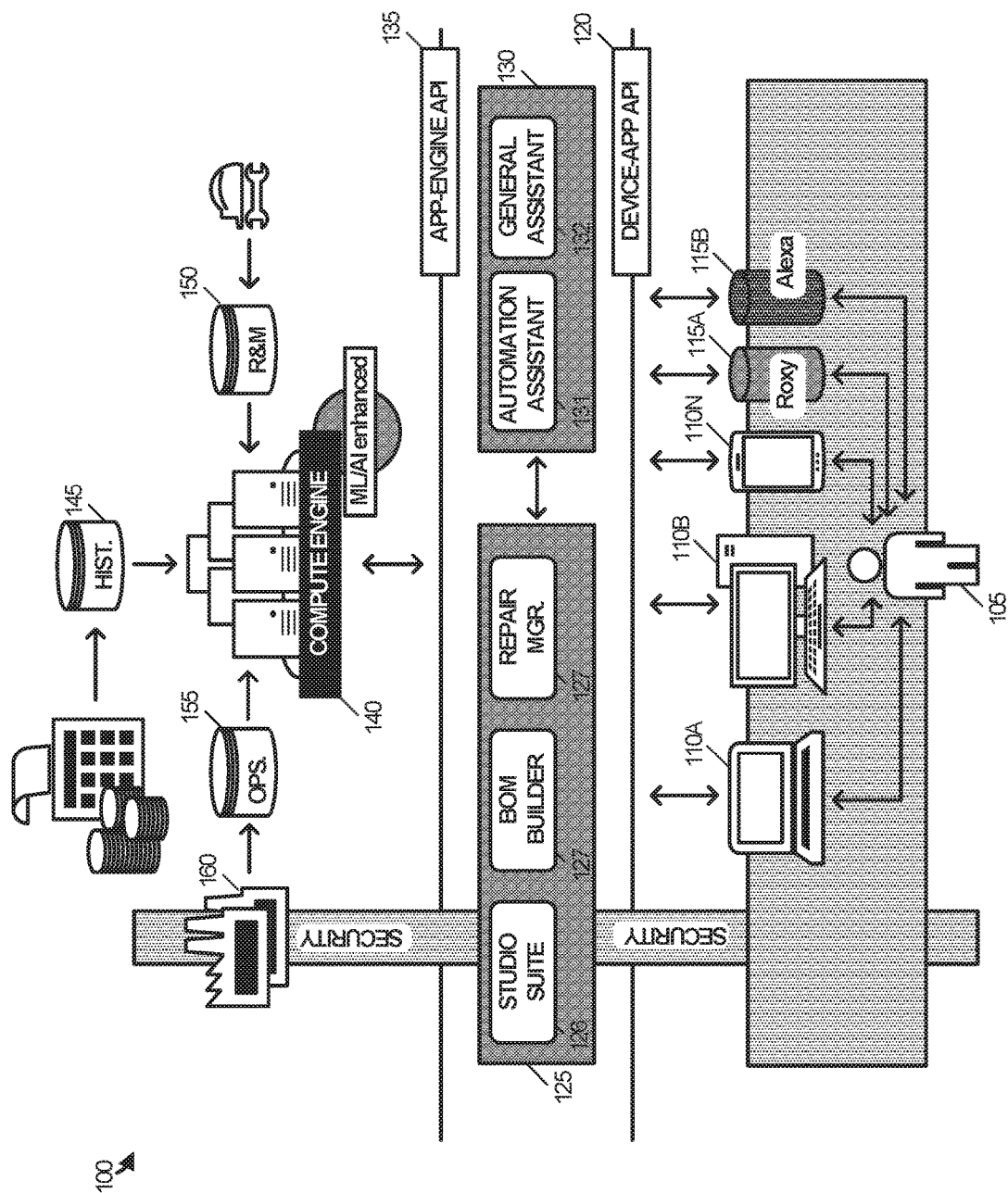
FIG. 1 illustrates an example of an integrated environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to industrial automation system design. More specifically, some embodiments of the present technology relate project optimization platforms and tools. Creating complex industrial automation systems requires a number of individuals in differing roles performing different activities. At the highest level the roles of these individuals can be divided into a presale phase and a post-sale phase. During the presale phase members of the sales team (e.g., system integrators and distributors) are tasked with understanding the customer's needs, initially designing a solution, and generating one or more estimates. Other tasks can include, procurement, ensure design will work, generating quotes and proposals, and the like.

Once the quote is ultimately accepted (possibly after some modifications) by the customer, the next step is to build and deliver the industrial automation machine. This part of the post-sale phase can include development work around delivering the machine. In many cases, control engineers write programs that will control the industrial automation system (e.g., read the inputs, control the outputs, etc.), design and build human machine interfaces (HMI), configure devices (e.g., making sure each component has the right firmware and other objects), and the like. Once the machine is installed, eventually the customer will need support for routine maintenance, repairs, and/or upgrades for this custom system.

Various embodiments of the present technology provide an integrated platform that provides optimization tools that can be used across all of the multiple lifecycle phases of an industrial automation system. In accordance with various embodiments, the integrated platform can take whatever is specified in a presale phase and easily open up that information in a corresponding tool to address needs in the post-sale phase to allow for all device commissioning, programming, and configuration without any importing, exporting, or recreation of presale files. As such, any layouts or designs can be easily opened up within the platform by users with differing roles. Moreover, if in the post-sale phase, a control engineer decides that a specific aspect of control system was left out, the control engineer can summon the capability of the presale phase to expand the system. As a result, there is a seamless integration (e.g., no user ever has to take additional steps to keep in presale records in sync with the post-sale) as project activity is represented by the same underlying representation or basis within the integrated platform.

Moreover, once an industrial automation system is commissioned, the integrated platform can provide guidance on selection to bring the system up to a contemporary configuration as components change. Various embodiments can use artificial intelligence to form presale recommendations and optimized experiences based on how components are connected and working in post-sale environments. For example, some embodiments can quickly review and analyze databases with records of existing configurations. If part A is being switched out with part B pretty often once an industrial automation machine is up and going, then the presale experience can be customized to recommend part B. Similarly, if there is a particular configuration for a specific application that is successful, then the integrated platform can streamline the upfront specification time by recommending the configuration. For example, if a design is being created for a vertical form post seal machine running at particular rate, the integrated platform can review typically specified and validated designs which the presale user can use this as a starting point as well as identifies components or configurations that maybe now work better for their machine.

Various embodiments of the present technology provide for a wide range of technical effects, advantages, and/or improvements to computing systems and components. For example, various embodiments include one or more of the following technical effects, advantages, and/or improvements: 1) holistic transformation of an automation project that effectively broadens the scope of the project in a way that allows the project files to work within an environment that treats the project as a lifecycle and not just a onetime deliverable for specific phase; 2) integrated management of project lifecycle phases allowing the project to be represented in a consistent way across multiple phases with different users; 3) proactive summoning capability of what has been traditionally seen as presale capability so that these capabilities are available at any time during the lifecycle; 4) use of unconventional and non-routine computer operations to contextually provide notifications and recommendations for component (or alternative component) selection based on lifecycle situations, delivery situations (e.g., parts still available but harder to get), performance considerations (e.g., a new switch to increase bandwidth), and other realization factors; 5) cross-platform integration of machine learning to more efficiently scope and surface component selection information; 6) integration of artificial intelligence to review customer activity and form intelligent presale and/or repair recommendations based on how historical designs are connected and working in post-sale environments; 7) changing the manner in which a computing system reacts to design and building of industrial automation machines; and/or 8) changing the manner in which a computing system reacts to user interactions and feedback.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an integrated environment in which some embodiments of the present technology may be utilized. In accordance with barrios embodiments, integrated environment 100 can provide a customized portal experience using a cloud-based data-center. The integrated environment 100 can provide a customized user experience based on readily access information from any domain, including live operations data flowing from manufacturing sites, historical business data, and repair and maintenance data, to name just a few.

As illustrated in FIG. 1, integrated environment 100 may include one or more computing devices 110A-110N (such as a mobile phone, tablet computer, mobile media device, mobile gaming device, vehicle-based computer, wearable computing device, etc.) and voice interfaces 115A-15B, The computing devices 110A-110N and voice interfaces 115A-15B can connect (e.g., via device application API 120) with applications and tools 125 and virtual assistants 130 which can connect (e.g., via app-engine API 135) to compute engine 140. An intermediate layer involves the applications and tools 125 and can include virtual assistants, powered by natural language processing capabilities, in support of user interactions with their applications and tools. The applications and tools 125 can interface with the compute engine 140 to take advantage of its machine learning and artificial intelligence capabilities.

At the user experience layer, customers and partners can interface with a portal in the usual ways, e.g. in the context of web browsers and application interfaces, but also via new types of devices, such as smart speakers, wearable devices, augmented reality devices, and the like. Integrated security capabilities will span all layers, reaching from the user experience layer, up through the applications and tools, to the compute engine 140.

Computing devices 110A-110N can include network communication components that enable the mobile devices to communicate with remote servers (e.g., hosting the applications and tools 125, virtual assistances 130, etc.) or other portable electronic devices by transmitting and receiving wireless signals using licensed, semi-licensed or unlicensed spectrum over a communications network. In some cases, communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Applications and tools 125 can include software that is useful for creating, building, and managing industrial automation systems. For example, as illustrated in FIG. 1, applications and tools 125 can include a studio suite 126, a bill of material builder 127, and a repair manager 128. Other embodiments may include different and/or additional applications such as but not limited to inventory management tools, user experience tools, and the like. Applications and tools 125 and virtual assistants 130 can be used by customers and partners to develop projects, put together bids, and otherwise interact with the product life cycle. In some embodiments, applications and tools 125 can utilize a specialized API 135 for interfacing with the compute engine. API 135 can enable the applications and tools 125 to call into the resources of the compute engine 140, including its machine learning, artificial intelligence, and natural language processing capabilities.

The machine learning and/or artificial intelligence can be used to improve the user experience. For example, the end-to-end user experience in some embodiments will allow for various personalization layers that differ based on who a person is, their role within an organization, their team, and other factors. As a user engages with the applications and tools 125, virtual assistants 130, web portal, and/or other channels, the user's experience can be customized based on these factors. Different work flows, different data streams, and/or different features and functionality can be exposed to the user based on their profile and interactions.

In accordance with various embodiments, compute engine 140 supplements the personalized user experience by surfacing recommendations to end users in the context of their work flow. In some embodiments, compute engine 140 can recommend product configurations, project recommendations, build of material recommendations, and bid recommendations. Compute engine 140 may also be configured to access past histories of builds, configurations, and purchases across a spectrum of users and deployments to optimize a user's project for its current context.

In some embodiments, compute engine 140, in conjunction with applications and tools 125, can accelerate the project development process for end users. Compute engine 140 can pre-select components for a project based on an analysis of past projects by a specific user and projects developed by other users. A project accelerator (not shown) can integrate with compute engine 140 to surface recommended components for a project. In addition, a given project can be optimized based on what is most important to the user (or user's company), such as time to delivery, cost, component availability, or performance considerations. The compute engine 140 can use a project optimizer integrated with an accelerator to assist a user in the project development phase. The optimizer within compute engine 140 also accesses historical data sets 145 from a wide range of contexts to arrive at an optimal project design for a given context. In addition, repair and maintenance records 150, operational data 155 from customer sites 160, and the like can also be used by compute engine 140 to create customized user experiences and recommendations.

Figure 2:
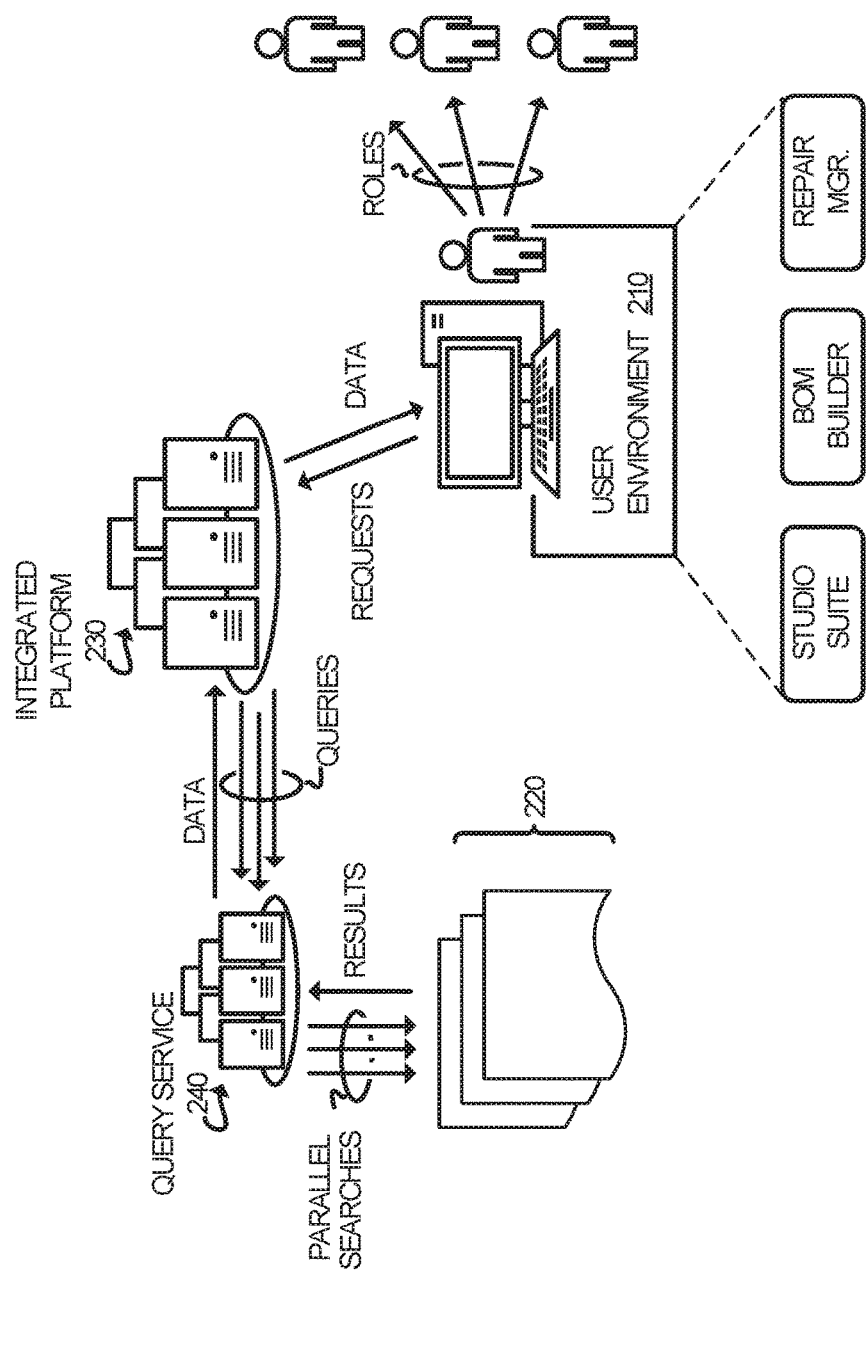
FIG. 2 illustrates data flow between various components of an integrated platform that may be used in one or more embodiments of the present technology.

FIG. 2 illustrates data flow between various components of an integrated platform that may be used in one or more embodiments of the present technology. As illustrated in FIG. 2, a user can access user environment 210 to access one or more applications or tools for managing a particular lifecycle phase of a product. The user can have different roles. For example, in a design phase, a distributor or systems integrator can access a bill of materials (BOM) builder. During a production phase, a maintenance technician can access a repair management tool. Similarly, during an owner of a piece of equipment may be able to access their project at any stage during the project lifecycle using the studio suite.

User environment 210 can make request to integrated platform to run multiple applications based on a common data file 220. In accordance with various embodiments, integrated platform 230 can take whatever is specified in a presale phase (e.g., using the BOM builder) and easily open up that information in a corresponding tool to address needs in the post-sale phase to allow for all device commissioning, programming, and configuration without any importing, exporting, or recreation of presale files. As such, any layouts or designs can be easily opened up within the platform by users with differing roles. Moreover, if in the post-sale phase, a control engineer decides that a specific aspect of control system was left out, the control engineer can summon the capability of the presale phase to expand the system. As a result, there is a seamless integration (e.g., no user ever has to take additional steps to keep in presale records in sync with the post-sale) as project activity is represented by the same underlying representation or basis within integrated platform 230.

The user environment can request data from integrated platform 230. Integrated platform 230 can make one or more queries to query service to access the underlying data file 220 for the project. Data file 220 can be in a format to optimize the capabilities of the tools and applications within the user environment. The needs for different lifecycles (e.g., presale and post-sale) can be holistically addressed by the shared data file. For example, data file 220 can have an XML based file structure in some embodiments. Data file 220 can accommodate the creation of new projects and not require the system to go back and change the way the consuming applications would work. The underlying structure the bid builder would access the data file to generate bid, read and write to data file 220. The other applications can also read and write to the same data file 220. Moreover, meta data within data file 220 can indicate which data is relevant for a particular project lifecycle phase.

In some embodiments, as the results are returned from query service 240, the data from data file 220 can be formatted (if needed) by integrated platform 230 so that the tools and applications within user environment 210 can present the data according to the role of the user. As a result, industrial automation projects can be put through different prisms, lenses, or frames for the optimal presentation within user environment 210. For example, the prisms, lenses, or frames can include, but are not limited to, a lowest cost frame, fastest delivery of components frame, fastest communication speeds frame, quickest available systems as part of a BOM frame, and/or the like.

Integrated platform 230 can also analyze the data (e.g., using machine learning or artificial intelligence) from multiple projects, companies, and roles to generate an enhanced or optimized user experience within user environment 210. For example, in a presale phase, integrated platform can generate initial machine designs based on characteristics about the user. In addition, notifications indicative of lifecycle situations, delivery situations (e.g., parts still available but harder to get), performance considerations (e.g., a new switch to increase bandwidth) and the like may also be automatically surfaced to influence the user's experience and selection. As another example, the tools and applications may submit (e.g., periodically or in real-time) system layouts for automated review and analysis by integrated platform 230. The validation capability provided by integrated platform 230, in some embodiments, can help the user ensure selected components are compatible, desirable, and/or most efficient in generate a proposal or quote.

Figure 3:
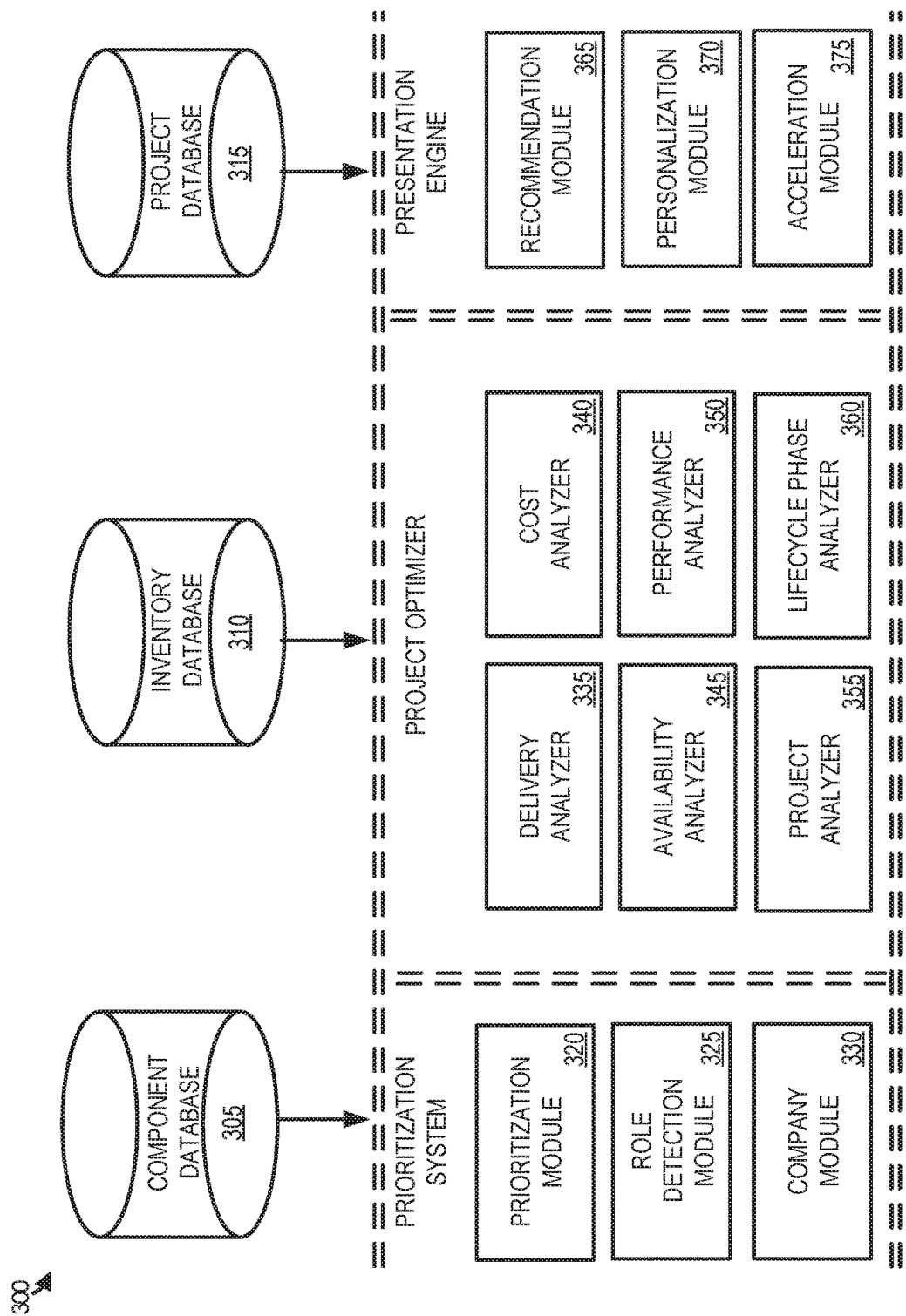
FIG. 3 illustrates a set of components that may be used within an integrated platform according to one or more embodiments of the present technology.

FIG. 3 illustrates a set of components 300 that may be used within an integrated platform according to one or more embodiments of the present technology. According to the embodiments shown in FIG. 3, integrated platform can include component database 305, inventory database 310, project database 315, prioritization module 320, role detection module 325, company module 330, delivery analyzer 335, cost analyzer 340, availability analyzer 345, performance analyzer 350, project analyzer 355, lifecycle phase analyzer 360, recommendation module 365, personalization module 370, and acceleration module 375. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, recommendation module 365, personalization module 370, and acceleration module 375 can be combined into a single module for presenting an enhanced customized experience to a user.

While not illustrated in FIG. 3, integrated platform can include processors and memory. The memory can be any device, mechanism, or populated data structure used for storing information. In accordance with some embodiments of the present technology, the memory can encompass any type of, but is not limited to, volatile memory, nonvolatile memory and dynamic memory. For example, the memory can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory.

The memory may be used to store instructions for running one or more applications or modules on one or more processor(s). For example, the memory could be used in one or more embodiments to house all or some of the instructions needed to execute the functionality of, prioritization module 320, role detection module 325, company module 330, delivery analyzer 335, cost analyzer 340, availability analyzer 345, performance analyzer 350, project analyzer 355, lifecycle phase analyzer 360, recommendation module 365, personalization module 370, and acceleration module 375. Some embodiments may also include an operating system that provides a software package that is capable of managing the hardware resources the integrated platform. The operating system can also provide common services for software applications running on one or more processor(s).

Prioritization module 320 can identify the priorities the user. This can be based on a variety of information and/or inferences made over time from historical interactions, user role, project lifecycle phase, company preferences, and the like. For example, role detection module can identify the current role of a user. In some cases, this may be easy as a user may only have one role such as a presale distributor. However, in other cases this may be more complicated as the user's role may change overtime for a particular project and/or project lifecycle phase. As such, role detection module 325 can access profile information, project information, and monitor current activity within the integrated platform by the user. The user's activity may be suggestive of the current role (e.g., based on selection of tool or application, specific inquiries, specific actions or selections, and the like). Company module 330 can use data provided by the company to set a profile for the company. For example, the company profile may indicate specific safety or operational standards they would like to comply with, general deadlines and timeframes, cost constraints, and the like. As such, prioritization module 320 can use information from each of these to prioritize the presentation (e.g., of components) within a tool or application.

In order to create an enhanced or optimized user experience various information may be needed to make information decisions or recommendations. In some embodiments, delivery analyzer 335 can analyze current inventory, order, presale activity, material shortages, geographical locations, and the like to identify any potential issues with delivery of components. Cost analyzer 340 can review the project, project goals, project priorities, and the like to analyze the costs of each component and generate alternative recommendations. For example, in some embodiments cost analyzer can not only review the immediate costs, but also the lifetime costs to own particular components and component configurations. While some components may be cheaper initially, the lifetime costs of the component may be more expense.

Availability analyzer 345 analyze current inventory, historical inventory, current orders, presale activity, component lifecycle plans, and the like to identify any potential issues with availability of components as replacement parts within a desired time horizon. For example, a particular switch may be in the process of being phased out of production. Equivalent components may have slightly different dimensions or ratings. As such, availability analyzer can identify the potential issue and alert the user. The user may still select this component, but at least the decision is based on knowledge the component is being phased out and replacement parts may have different dimensions.

Performance analyzer 350 can analyze the industrial automation design and generate recommendations for improving throughput, reducing failure rates, reducing energy consumption, and/or other performance characteristics of the design. Project analyzer 355 can analyze the compliance with various priorities identified by the prioritization system and generate one or more recommendations. Lifecycle phase analyzer 360 can analyze the lifecycle of the industrial automation design and generate recommendations for different components to improve the design.

Recommendation module 365 can take the information from delivery analyzer 335, cost analyzer 340, availability analyzer 345, performance analyzer 350, project analyzer 355, and/or lifecycle phase analyzer 360 to generate a holistic enhanced presentation of information that will allow the user to make informed decisions. Personalization module 370 presents the recommendations in an order and/or manner personalized to the user within each of the applications or tools. In some embodiments, acceleration module 375 can accelerate the initial designs based on characteristics about the user and/or project. For example, acceleration module can generate an initial design or selection of components based on lifecycle situations, delivery situations (e.g., parts still available but harder to get), performance considerations (e.g., a new switch to increase bandwidth) and the like to accelerate the user's experience.

Figure 4:
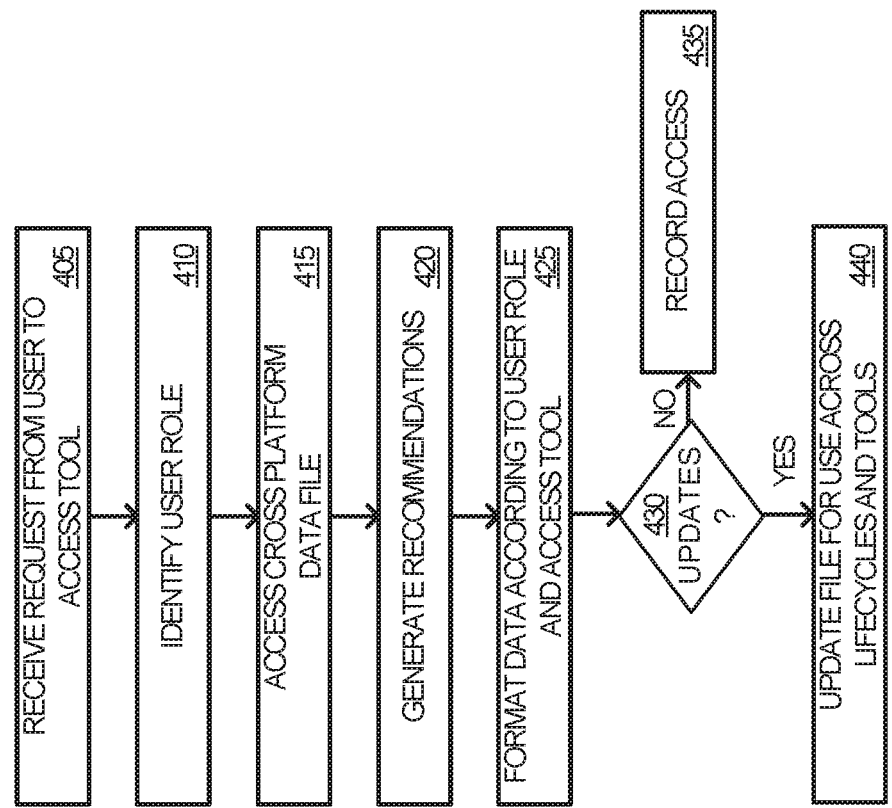
FIG. 4 is a flowchart illustrating a set of operations for managing a customized user experience according to one or more embodiments of the present technology.

FIG. 4 is a flowchart illustrating a set of operations 400 for managing a customized user experience according to one or more embodiments of the present technology. As illustrated in FIG. 4, requesting operation 405 receives a request from a user to access an application or tool. Identification operation 410 identifies the current role of the user. For example, identification operation 410 can identify roles in the presale and post-sale lifecycle of the industrial automation project. Once the user's role is identified, access operation 415 accesses a cross platform data file that can be used in any stage of the project lifecycle (e.g., from initial quote to build to eventual repairs or upgrades). The cross-platform data file provides a common location for all data about the project. In some embodiments, this may be an XML file which meta data identifying data relevant to different lifecycle phases of the industrial automation project.

Once the data is accessed, formatting operation 425 can select and format the data according to the current role of the user and the access tool requesting the information. In some embodiments, formatting operation may present a high-level summary of relevant information for decisions or management which can be refined with more detail upon user requests. Determination operation 430 determines whether the tool or application makes any changes to the data file. When determination operation 430 determines no changes were made (e.g., to the bill of materials, electrical layout, etc.), then determination operation 430 branches to recordation operation 435 where access to the file is recorded. When determination operation 430 determines that changes were made to the file (e.g., component updates, different replacement parts, electrical redesign, etc.), then update operation 440 can update the file for use across all lifecycle inquires and tool requests. For example, a change made to a component during a repair will update the bill of material. This can be useful for example, if a user wants to duplicate the industrial automation machine at a different location. In this way, the machine remain identical and later design changes are automatically reflected in an updated bill of materials for the new machine.

Figure 5:
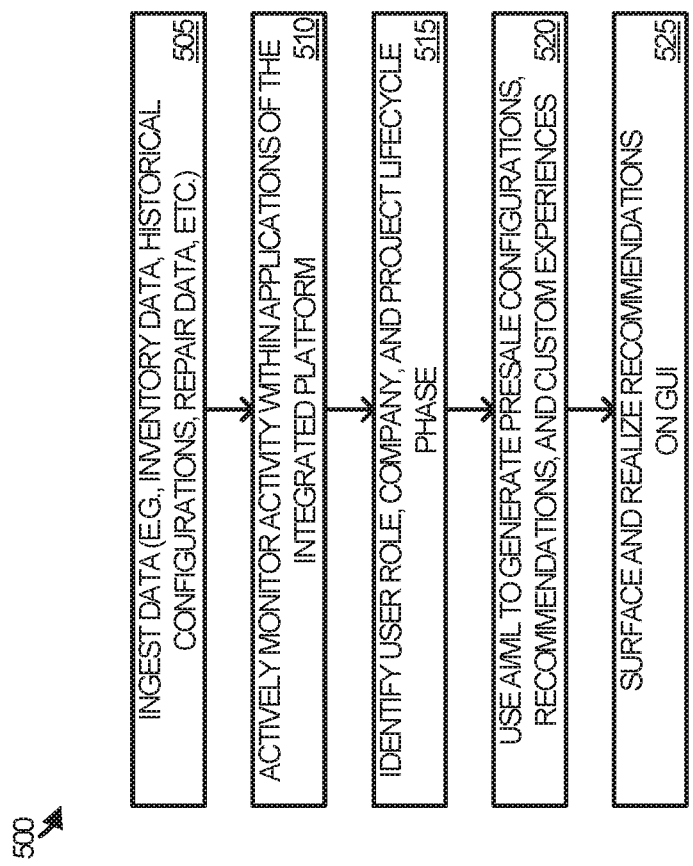
FIG. 5 is a flowchart illustrating a set of operations for operating for generating custom recommendations and user experiences within an integrated platform in accordance with some embodiments of the present technology.

FIG. 5 is a flowchart illustrating a set of operations 500 for operating for generating custom recommendations and user experiences within an integrated platform in accordance with some embodiments of the present technology. During ingestion operation 505, data can be ingested and formatted. The data can include, in accordance with various embodiments, inventory data, historical configuration data, repair data, failure data, performance data, energy consumption data, and the like. Monitoring operation 510 actively monitors activity within an application or tool of the integrated platform. For example, the user may be selecting a particular part, designing a common subsystem, or the like. Identification operation 515 can identify the user role, company, and project lifecycle phase. Enhancement operation 520 can use artificial intelligence or machine learning to generate an enhanced user experience. In accordance with various embodiments, the enhancements can include, but are not limited to, presale configurations, recommendations for alternate parts (e.g., based on costs, availability, etc.) and the like. These enhancements can be surfaced within the application or tool using surfacing operation 525.

Figure 6:
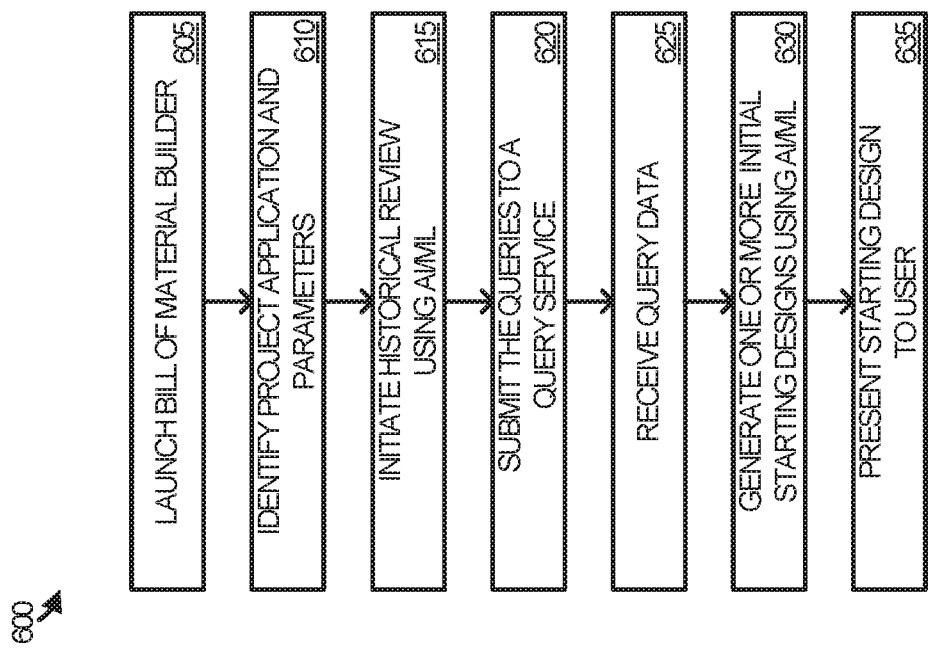
FIG. 6 is flowchart illustrating a set of operations for automatically generating a bill of materials in accordance with one or more embodiments of the present technology.

FIG. 6 is flowchart illustrating a set of operations 600 for automatically generating a bill of materials in accordance with one or more embodiments of the present technology. As illustrated in FIG. 6, building operation 605 launches a bill of material builder. Identification operation 610 can identify project applications and parameters, Review operation 615 takes this information and initiates a historical review for similar activity using artificial intelligence or machine learning. Submission operation 625 submits a data query to a query service to retrieve the cross-platform file. Any propriety or confidential data (e.g., identified by metadata) may be removed from the analysis.

Receiving operation 625 receives the data and generation operation 630 generates one or more initial starting designs. These designs can be presented to the user during presentation operation 635. The user of the application or tool is then free to ignore or start with one of these designs. The application or tool may identify a previous design made entirely from the current user or indicate that the design is a hybrid design across multiple companies or users.

Figure 7:
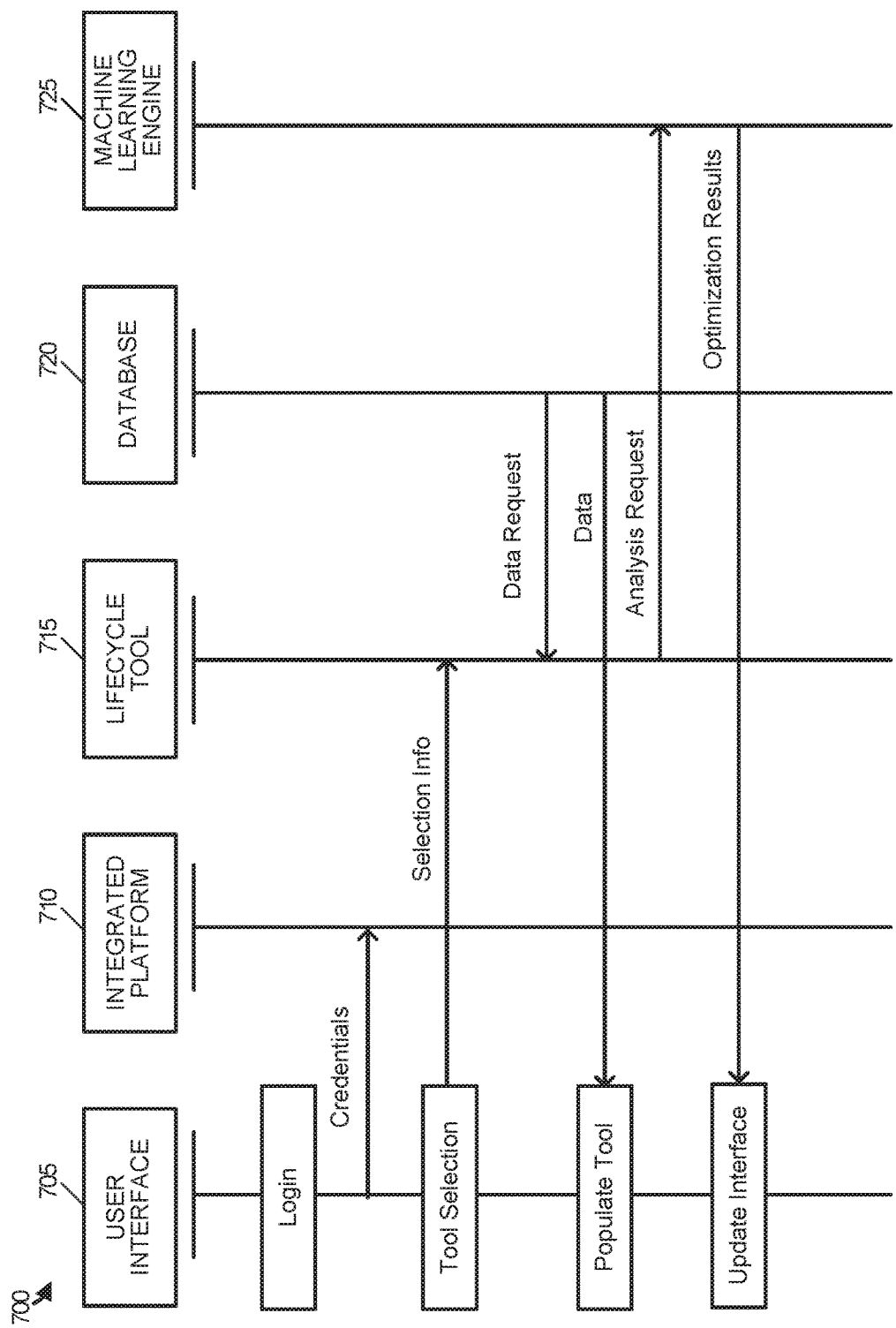
FIG. 7 is a sequence diagram illustrating an example of the data flow between various components of an integrated platform according to various embodiments of the present technology.

FIG. 7 is a sequence diagram 700 illustrating an example of the data flow between various components of an integrated platform according to various embodiments of the present technology. As illustrated in FIG. 7, a user can log in using user interface 705. The credentials supplied by the user can be submitted to integrated platform 710 for validation. Once validated, the user can select a lifecycle tool 715. Lifecycle tool 715 can request data from database 720 which can be used to populate the instantiation of the tool within user interface 705. Lifecycle tool 715 can request an analysis of the activity within lifecycle tool 715 by machine learning engine 725. The optimization results can then be sent back to user interface 705 where recommendations or other presentation enhancements can be presented to the user.

Exemplary Computer System Overview

Figure 8:
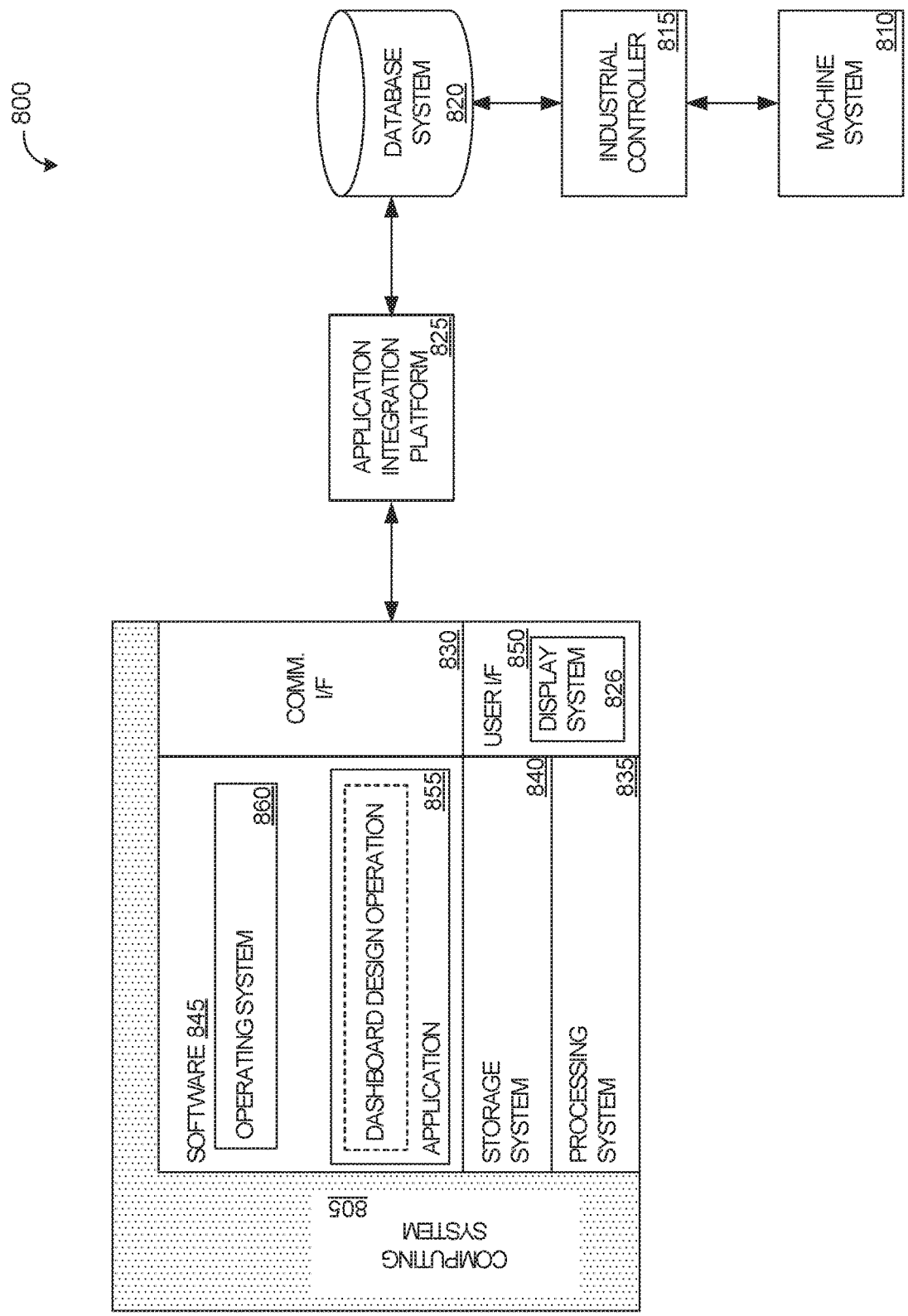
FIG. 8 is an example of a computer system associated with an industrial automation system.

FIG. 8 illustrates a block diagram of an industrial automation environment 800 in an exemplary implementation is shown. Industrial automation environment 800 provides an example of an industrial automation environment that may be utilized as disclosed herein, but other environments could also be used. Industrial automation environment 800 includes computing system 805, machine system 810, industrial controller 815, database system 820, and application integration platform 825. Machine system 810 and controller 815 are in communication over a communication link, controller 815 and database system 820 communicate over a communication link, database system 820 and application integration platform 825 communicate over a communication link, and application integration platform 825 and computing system 805 are in communication over a communication link. Note that there would typically be many more machine systems in most industrial automation environments, but the number of machine systems shown in FIG. 8 have been restricted for clarity.

Industrial automation environment 800 comprises an automobile manufacturing factory, food processing plant, oil drilling operation, microprocessor fabrication facility, or some other type of industrial enterprise. Machine system 810 could comprise a sensor, drive, pump, filter, drill, motor, robot, fabrication machinery, mill, printer, or any other industrial automation equipment, including their associated control systems. A control system comprises, for example, industrial controller 815, which could include automation controllers, programmable logic controllers (PLCs), programmable automation controllers (PACs), or any other controllers used in automation control of machine system 810. Additionally, machine system 810 could comprise other industrial equipment, such as a brew kettle in a brewery, a reserve of coal or other resources, or any other element that may reside in an industrial automation environment 800.

Machine system 810 continually produces operational data over time. The operational data indicates the current status of machine system 810, such as parameters, pressure, temperature, speed, energy usage, overall equipment effectiveness (OEE), mean time between failure (MTBF), mean time to repair (MTTR), voltage, throughput volumes, times, tank levels, or any other performance status metrics. Machine system 810 and/or controller 815 is capable of transferring the operational data over a communication link to database system 820, application integration platform 825, and computing system 805, typically via a communication network. Database system 820 could comprise a disk, tape, integrated circuit, server, or some other memory device. Database system 820 may reside in a single device or may be distributed among multiple memory devices.

Application integration platform 825 comprises a processing system and a communication transceiver. Application integration platform 825 may also include other components such as a router, server, data storage system, and power supply. Application integration platform 825 provides an example of application servers, although the servers could use alternative configurations. Application integration platform 825 may reside in a single device or may be distributed across multiple devices. Application integration platform 825 may be a discrete system or may be integrated within other systems—including other systems within industrial automation environment 800. In some examples, application integration platform 825 could comprise a FactoryTalk® Vantage Point server system provided by Rockwell Automation, Inc.

The communication links over which data is exchanged between machine system 810, industrial controller 815, database system 820, application integration platform 825, and communication interface 830 of computing system 805 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 805 may be representative of any computing apparatus, system, or systems on which the event data saving processes disclosed herein or variations thereof may be suitably implemented. Computing system 805 provides an example of a computing system that could be used as either a server or a client device in some implementations, although such devices could have alternative configurations. Examples of computing system 805 include mobile computing devices, such as cell phones, tablet computers, laptop computers, notebook computers, and gaming devices, as well as any other type of mobile computing devices and any combination or variation thereof. Examples of computing system 805 also include desktop computers, server computers, and virtual machines, as well as any other type of computing system, variation, or combination thereof. In some implementations, computing system 805 could comprise a mobile device capable of operating in a server-like fashion which, among other uses, could be utilized in a wireless mesh network.

Computing system 805 includes processing system 835, storage system 840, software 845, communication interface 830, and user interface 850. Processing system 835 is operatively coupled with storage system 840, communication interface 830, and user interface 850. Processing system 835 loads and executes software 845 from storage system 840. Software 845 includes application 855 and operating system 860. Application 855 may include the dashboard optimization operations described herein in some examples. When executed by computing system 805 in general, and processing system 835 in particular, software 845 directs computing system 805 to operate as described herein or variations thereof. In this example, user interface 850 includes display system 826, which itself may be part of a touch screen that also accepts user inputs via touches on its surface. Computing system 805 may optionally include additional devices, features, or functionality not discussed here for purposes of brevity.

Storage system 840 may comprise any storage media readable by processing system 835 and capable of storing software. Storage system 840 may include volatile and nonvolatile, removable and non-removable media implemented in any method or technology for storage of information, such as computer readable instructions, data structures, program modules, or other data. Storage system 840 may be implemented as a single storage device but may also be implemented across multiple storage devices or subsystems. Storage system 840 may comprise additional elements, such as a controller, capable of communicating with processing system 835. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in storage system 840 may comprise computer program instructions, firmware, or some other form of machine-readable processing instructions having processes that when executed by processing system 835 direct the processing system 835 to operate as described herein.

The software may also include user software applications. The software may be implemented as a single application or as multiple applications. In general, the software may, when loaded into processing system 835 and executed, transform processing system 835 from a general-purpose device into a special-purpose device customized as described herein.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for operating an integrated platform, the method comprising:
creating, by the integrated platform, a cross-platform file for an industrial automation project, the industrial automation project comprising one or more industrial automation machines, each of the one or more industrial automation machines comprising an associated control system, the cross-platform file configured for use in a plurality of applications hosted by the integrated platform;
receiving, via a graphical user interface, a first selection of a first application of the plurality of applications hosted by the integrated platform, wherein the first application is associated with a first Recycle phase of a plurality of lifecycle phases of the industrial automation project;
accessing a query service to query the cross-platform file, wherein the cross-platform file comprises a plurality of data regarding the industrial automation project across the plurality of lifecycle phases, and the cross-platform file comprises metadata indicating, for each of the plurality of data, an associated lifecycle phase of the plurality of lifecycle phases;
analyzing, using a machine learning engine, multiple cross-platform files, and generating an initial design of at least a portion of the industrial automation project based on an output from the machine learning engine:
populating, the first application with a first subset of data from the cross-platform file in compliance with requirements of the first application, wherein the first subset of data is selected based at least in part on the metadata indicating the first subset of data is associated with the first lifecycle phase, and wherein the first application reads from and writes to the cross-platform file via the query service;
receiving, via the graphical user interface, a second selection of a second application of the plurality of applications hosted by the integrated platform, wherein the second application is associated with a second lifecycle phase of the plurality of lifecycle phases of the industrial automation project; and
populating the second application with a second subset of data from the cross-platform file in compliance with the requirements of the second application, wherein the second subset of data is selected based at least in part on the metadata indicating the second subset of data is associated with the second lifecycle phase, and wherein the second application reads from and writes to the cross-platform file via the query service.

2. The method of claim 1, further comprising identifying a role of a user, wherein the role associated with the user has restrictions on data access within the cross-platform file.

3. The method of claim 1, wherein the plurality of lifecycle phases of the industrial automation project include a presale lifecycle phase and a post-sale lifecycle phase.

4. The method of claim 1, wherein the first application is a bill of material builder to create the initial design and quote.

5. The method of claim 1, further comprising:
monitoring activity and selection within the first application hosted by the integrated platform; and
generating one or more enhanced user experiences based on the activity and selection detected within the first application.

6. The method of claim 1, wherein a current lifecycle phase of the industrial automation project is within a post-sale phase and wherein any changes to a design of the industrial automation project automatically update a bill of materials within the cross-platform file.

7. A platform comprising:
a processor;
a plurality of applications configured to service activities common during a plurality of lifecycle phases of an industrial automation project, wherein the industrial automation project comprises one or more industrial automation machines, and each of the one or more industrial automation machines comprising an associated control system, and wherein each of the plurality of applications is associated with a lifecycle phase of the plurality of lifecycle phases;

a database having stored thereon a cross-platform file associated with the industrial automation project that can be used by the plurality of applications in any lifecycle phase of the plurality of Recycle phases, wherein the cross-platform file comprises a plurality of data regarding the industrial automaton project across the plurality of lifecycle phases, and the cross-platform file comprise metadata indicating, for each of the plurality of data, an associated lifecycle phase of the plurality of lifecycle phases; and a machine learning engine, analyze multiple cross-platform files, and generate an initial design of at least a portion of the industrial automation project based on an output from the machine learning engine;

a compute engine to monitor the activity within the plurality of applications, populate the plurality of applications with subsets of data from the cross-platform file based at least in part on the metadata of the subsets of data matching the associated lifecycle phase to the associated lifecycle phase of the respective application; and avow the plurality of applications to read from and write to the cross-platform file.

8. The platform of claim 7, wherein the compute engine further comprises a recommendation engine to generate an alternative selection within the plurality of applications based on a machine learning review of the cross-platform file.

9. The platform of claim 7, wherein the plurality of applications include a studio suite, a bill of materials builder, or a repair manager.

10. The platform of claim 7, wherein changes to a design of the industrial automation project in a post-sale lifecycle phase are automatically reflected within any bill of materials generated from the cross-platform file.

11. The platform of claim 7, wherein the compute engine analyzes multiple cross-platform files to generate the initial design or alternative design of the industrial automation project.

12. The platform of claim 7, wherein the compute engine analyzes component lifecycle durability based on repair records within multiple cross-platform files.

13. The platform of claim 7, wherein the cross-platform file has an extensible markup language (XML) format.

14. A computer-readable medium, excluding transitory signals, storing instructions that when executed by one or more processors cause a machine to:

create a cross-platform file for an industrial automation project, the industrial automation project comprising one or more industrial automation machines, each of the one or more industrial automation machines comprising an associated control system, the cross-platform file configured for use in a plurality of applications hosted by an integrated platform;

receive a first selection of a first application of the plurality of applications, wherein the first application is associated with a first lifecycle phase of a plurality of lifecycle phases of the industrial automation project;

access a query service to query the cross-platform file, wherein the cross-platform file comprise a plurality of data regarding the industrial automation project across the plurality of lifecycle phases, and the cross-platform file comprises metadata indicating, for each of the plurality of data, an associated lifecycle phase of the plurality of lifecycle phases;

analyzing, using a machine learning engine, multiple cross-platform files, and generating an initial design of at least a portion of the industrial automation project based on an output from the machine learning engine;

populate the first application with a first subset of data from the cross-platform file in compliance with requirements of the first application, wherein the first subset of data is selected based at least in part on the metadata indicating the first subset of data is associated with the first lifecycle phase, and wherein the first application reads from and writes to the cross-platform file via the query service;

receive a second selection of a second application of the plurality of applications, wherein the second application is associated with a second lifecycle phase of the plurality of lifecycle phases of the industrial automation project; and populate the second application with a second subset of data from the cross-platform file in compliance with the requirements of the second application, wherein the second subset of data is selected based at least in part on the metadata indicating the second subset of data is associated with the second lifecycle phase, and wherein the second application reads from and writes to the cross-platform file via the query service.

15. The computer-readable medium of claim 14, wherein the first application is a bill of material builder to create the initial design and quote.

16. The computer-readable medium of claim 15, wherein the instructions when executed by the one or more processors further cause the machine to:

analyze, using a machine learning engine, multiple cross-platform files; and generate an initial design of at least a portion of the industrial automation project based on an output from the machine learning engine.

17. The computer-readable medium of claim 14, wherein a current lifecycle phase of the industrial automation project is within a post-sale phase and wherein any changes to a design of the industrial automation project automatically update a bill of materials within the cross-platform file.

18. The computer-readable medium of claim 14, wherein the instructions when executed by the one or more processors further cause the machine to analyze component lifecycle durability based on repair records within multiple cross-platform files.

* * * * *